Sept. 24, 1957        F. L. COLLINS        2,807,257
PORTABLE HEATER
Filed July 15, 1954
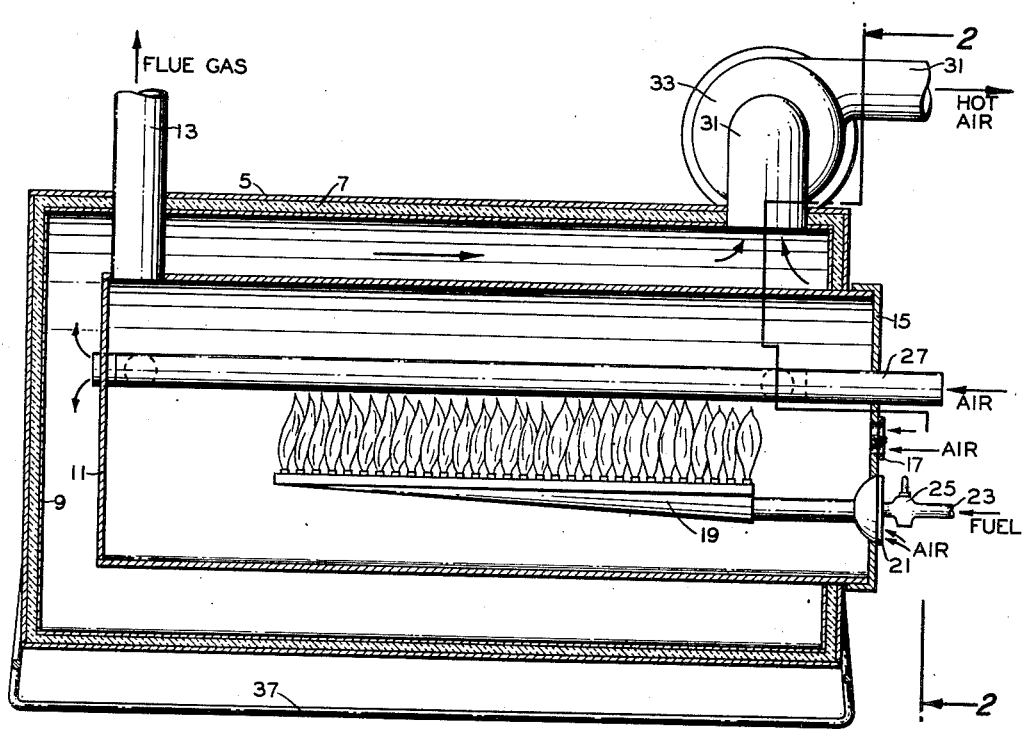
FIG. 1.
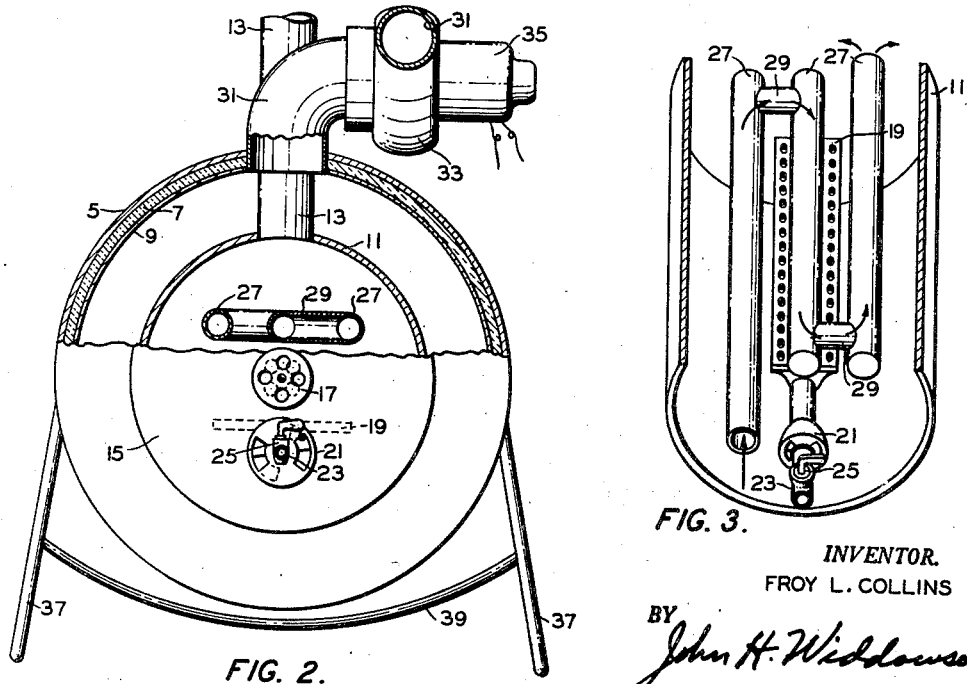
FIG. 2.
FIG. 3.
INVENTOR.
FROY L. COLLINS
BY *John H. Widdowson*
ATTORNEY

United States Patent Office 2,807,257
Patented Sept. 24, 1957

2,807,257

PORTABLE HEATER

Froy L. Collins, Burden, Kans.

Application July 15, 1954, Serial No. 443,551

2 Claims. (Cl. 126—109)

This invention relates to heating. In a more specific aspect, this invention relates to portable heating means. In a still more specific aspect, this invention relates to a portable hot air heater which heats the air by burning a combustible fuel, and which is particularly advantageously used in the field to warm up for starting combustion engines in such as trucks, automobiles, pump assemblies, construction equipment, etc.

Heating equipment which delivers heated air for heating or warming articles is known in the prior art, and heat exchange means utilizing combustible fuels and which heat air are known in the prior art. However, these heaters of the prior art are of such construction that they cannot be used in field operations without a great deal of trouble. In many instances, field equipment remains out in extreme cold weather for long periods so that the lubricating oil and grease becomes very stiff, and the engines of such equipment become difficult if not impossible to start without first heating to make less viscous the lubricating oils and greases. Equipment using a direct flame to heat such equipment is not at all satisfactory because of the fire hazard from oil waste commonly associated with and in and around such equipment. In addition, the devices of the prior art are very cumbersome, necessarily so to obtain efficient recovery of potential heat in the fuel because of their structure, and their cumbersomeness makes them unsatisfactory to use since engines of vehicles are usually centrally located relatively speaking and protected from easy access by wheels, fenders, steering mechanisms, etc. Portable heating equipment which is relatively small for a given heat delivery, and which can be moved close to vehicle engines in field locations and which efficiently utilizes combustible fuel, has long been needed in the art. I have invented such apparatus.

The new portable hot air heater of my invention has an outer housing or shell which is preferably insulated against the passage of heat therethrough. A combustion chamber is mounted within the housing or shell, and I have found it preferable that the shell and combustion chamber be elongated with the combustion chamber longitudinally of the shell or housing, this being an important feature and giving high efficiency in my new heater and resulting in a large heat output relative to the size of the heater. The new heater of my invention has a flue gas conduit which communicates with the combustion chamber and which is adapted to pass flue gases outside the shell or housing. Burner means, preferably of the standard air and combustion fuel type with usual mixing means, is mounted in the combustion chamber. Heat exchange means for conducting the air while heating same is mounted within the combustion chamber and such has an inlet for atmospheric air outside the housing and an outlet for heated air in the space between the housing and combustion chamber. My new apparatus has a discharge conduit for passing heated air out of the housing from the space between the housing and combustion chamber, and such discharge is preferably located in relation to the heated air outlet from the combustion chamber into such space so that the air travels over and around the combustion chamber prior to being discharged from the heater; this feature giving rise to high efficiency with a minimum of space consuming and weighty heat exchange means. I prefer to use blower means in the discharge conduit to draw air into the heater from the atmosphere and discharge heated air, centrifugal blower means having been found preferable particularly when the heated air is to be delivered to a remote location such as through a flexible conduit on the discharge. The new portable heater of my invention functions to take in air outside the housing from the atmosphere through the heat exchange means in the combustion chamber and heat the air upon burning fuel in the combustion chamber, and to discharge heated air for use through the discharge conduit.

The new portable hot air heater of my invention has many advantages. It is highly efficient, and because of its unique structure delivers a relatively great amount of heat per unit weight and size. This is important and has been found very desirable particularly in field use to heat cold combustion engines. Construction operations, oil field operations, and the like, are many times remotely located from any usable and convenient source of safe heat, and with my portable heater which can conveniently be operated on natural gas, liquefied petroleum gas, fuel oil of various grades, etc., which can conveniently be transported, the problems encountered in severe winter climates in starting engines are easily overcome. I have found that portable heaters of my design for any size vehicle engine can be mounted on runners and moved easily.

It is an object of my invention to provide new and efficient heating means.

It is another object of my invention to provide a new and efficient portable hot air heater.

Still another object of this invention is to provide a new and highly efficient portable hot air heater which can be operated on natural gas, liquefied petroleum gas, fuel oil, and the like, such portable heater being particularly advantageously used in the field to heat engines in which the lubricating oils and greases have become stiff and very viscous due to low temperature.

Other objects and advantages of the new portable hot air heater of my invention will become apparent to one skilled in the art upon reading this disclosure.

Drawings accompany and are a part of this disclosure. Such drawings depict preferred specific embodiments of the new portable hot air heater means of my invention, and it is to be understood that the drawings are not to unduly limit the scope of my invention.

In the drawings, Fig. 1 is a longitudinal elevation view, partly in cross section and partly cut away, of a preferred specific embodiment of the new portable hot air heating means of my invention.

Fig. 2 is a view taken on line 2—2 of Fig. 1.

Fig. 3 is a perspective view partly in cross section and partly cut away of the combustion chamber, air conduit means of the heat exchange means, and the burner means of the apparatus of my invention shown in Figs. 1 and 2.

Following is a discussion and description of my invention made with reference to the drawings on which the same reference numerals are used to indicate the same parts or structure. The discussion and description is of preferred specific embodiments of my invention, and it is to be understood that such is not to unduly limit the scope of my invention.

The new portable hot air heater of my invention has an outer shell or housing 5, and this housing 5 is preferably lined with insulation 7, which can conveniently be glass fibers, rock wool, other fire resistant type insulation, and the like. I have found it convenient and advantageous to use an inner covering 9 to hold the insulation 7 in place and to give added strength to the housing structure.

An elongated combustion chamber 11 is longitudinally and coaxially mounted in cylindrical housing 5, and a flue gas stack 13 attached in any suitable manner to the combustion chamber 11 projects out through shell 5 to carry flue gases from the combustion chamber out of the heater. Combustion chamber 11 projects out through one end of shell 5 and a cap 15 is mounted thereon. I have found that combustion chamber 11 can be suitably mounted and supported within housing 5 by flue gas stack 13 and the end of housing 5 through which the combustion chamber projects. The use of weldable metal for housing 5, combustion chamber 11 and flue gas stack 13 has been found very advantageous, and these parts can be conveniently welded together in the position shown in the drawings. Cap 15 of the heater which covers the outer end of the combustion chamber has damper means therewith, preferably using rotatable plate 17 having holes therein corresponding to holes in cap 15. Combustible fuel burner means 19 projects through cap 15 into the combustion chamber, and this burner means can be of common and standard design such as that depicted having adjustable air combustible fuel mixing means 21 and supplied with fuel via line 23 having a valve 25 therein. The device of my invention then can be operated on any suitable combustible fuel, such as natural gas, gasoline fractions, liquefied petroleum gases, fuel oil, etc.

Heat exchange means for conducting air during heating of same is mounted within combustion chamber 11 above burner means 19. This heat exchange means is preferably tubes 27 connected as shown by tube sections 29 so that the air being heated has a plurality of passes through the combustion chamber. One of the ends of the tubular heat exchange means 27 projects out through and is mounted in cap 15, this end furnishing the inlet of atmospheric air into my portable heating means. The other end of tubular heat exchange means 27 projects out through and is mounted in the inner end of combustion chamber 11, this end furnishing the outlet for heated air into the space in my heater between combustion chamber 11 and inner facing member 9.

The heated air discharged from tubular heat exchange means 27 passes over and around flue gas stack 13 and combustion chamber 11 and is discharged out of the heater through a discharge conduit 31 mounted in any suitable manner in shell or housing 5 and communicating with the space between combustion chamber 11 and inner facing 9 near the outer end portion of the combustion chamber. Discharge conduit 31 has blower means 33 therein, which is preferably centrifugal blower means so that the heated air can be discharged and delivered to a remote location by a conduit or flexible tube fastened to discharge conduit 31, and in this connection I have found that a pit and equipment therein can conveniently be heated by backing my apparatus up to the edge of the pit and dropping flexible hoses connected to the air inlet of heat exchange means 27 and discharge conduit 31 into the pit. In operation, the air is thus withdrawn from the pit, heated and discharged back into same. However, discharge conduit 31 can be pointed in any direction, and if desired, it can be constructed so as to be easily adjusted to any desired direction. Motor 35 powers blower 33, and I have found that this motor can conveniently be a 6-volt electric motor allowing for running the blower to operate the heater from the usual vehicle battery.

Runners 37 connected by cross members 39 are attached to housing or shell 5 of my heater and mount the heater so that it can be easily moved to desired location. I have found wheels to be equally suitable, but the runner construction is economical and efficient, and because of the efficiency resulting from the unique structure of my heater, runners can be used for any size and weight of heater required for warming up and starting any size of vehicle combustion engine.

To use the new portable hot air heater of my invention, one first starts the burner means operating with available fuel, and adjusts the burner mixing apparatus 21 and damper means 17 to give a suitable hot and efficient flame within combustion chamber 11. Motor 35 is then started to operate blower 33, preferably after a short preheating period. Upon starting of blower 33, atmospheric air is drawn in and through tubular heat exchange means 27 in combustion chamber 11, and this air is heated during passage therethrough. The heated air is discharged from means 27 into the space between combustion chamber 11 and liner 9. It then passes back over combustion chamber 11, being heated further, and is discharged out through conduit 31 and blower 33. The hot air is directed at the article or space desired to be heated.

As will be evident to those skilled in the art, various modifications of my invention can be made, or followed, in the light of this disclosure and discussion, without departing from the spirit or scope of the disclosure or from the scope of the claims.

I claim:

1. A portable hot air heater comprising, in combination, an elongated, closed, cylindrical shell, said shell being insulated against the flow of heat therethrough, means forming an elongated, hollow, closed cylindrical combustion chamber longitudinally mounted in said shell in spaced relation to the sides and one end of said shell and through the other end thereof with an end portion of said combustion chamber projecting therefrom, a cap member mounted on said projecting end portion to close same, a damper mounted in said cap member, a flue gas stack communicating between said combustion chamber in the inner end portion and a point outside said shell, burner means having fuel and air mixing means mounted in said cap member and projecting into said combustion chamber, tubular heat exchange means mounted in said combustion chamber and extending longitudinally thereof and having a continuous passageway passing back and forth a plurality of times in said combustion chamber and in heat exchange relation with said burner means and with one end portion mounted in said cap member and the other end portion mounted in the inner end of said combustion chamber and communicating between a point outside said shell near the outer end portion of said combustion chamber and a point in the space between said shell and said combustion chamber near the inner end portion of said combustion chamber, a discharge conduit having blower means therein communicating between a point outside said shell and a point in said space between said shell and said combustion chamber near said outer end portion of said combustion chamber, runners longitudinally mounted on said shell to aid in moving said heater, and said heater being portable and adapted to take air from outside said shell through said heat exchange means and heat said air upon operating said blower and burning fuel in said combustion chamber and discharge heated air through said discharge conduit, and said inner outlet of said tubular heat exchange means, said flue gas stack and said discharge conduit being positioned in said heater so that said air upon exit from said tubular heat exchange means into said space between said shell and combustion chamber passes in heat exchange relation with said flue gas conduit and said combustion chamber prior to exit from said heater.

2. A portable air heater comprising, in combination, an elongated, closed shell insulated against the flow of heat therethrough, means forming an elongated, closed combustion chamber longitudinally mounted in said shell with one end portion of said combustion chamber in spaced relation to the sides and one end of said shell and with the other end portion of said combustion chamber projecting from the other end of said shell, a cap member mounted on said projecting end portion of said combustion chamber to close same, a damper mounted in said cap member, burner means having fuel and air mixing means mounted in said cap member and projecting longitudinally into said combustion chamber, a flue gas outlet conduit communicating between said combustion chamber in the inner end portion and a point outside said shell, tubular heat exchange means mounted in said combustion chamber, said heat exchange means extending longitudinally in said combustion chamber, having a continuous passageway passing back and forth a plurality of times, being in heat exchange relation with said burner means, having one end portion mounted in said cap member and the other end portion in the inner end of said combustion chamber, and communicating between a point outside said shell near the outer end portion of said combustion chamber and a point in the space between said shell and said combustion chamber near said inner end portion of said combustion chamber, an air discharge conduit having blower means therein communicating between a point outside said shell and a point in said space between said shell and said combustion chamber near said outer end portion of said combustion chamber, the inner outlet of said tubular heat exchange means, said flue gas conduit and said air discharge conduit being positioned in said heater so that air upon exit from said tubular heat exchange means into said space between said shell and combustion chamber passes in heat exchange relation with said flue gas conduit and said combustion chamber prior to exit from said heater, support means mounted on said shell to aid in moving said heater, and said heater being portable and adapted to take air from outside said shell through said heat exchange means and heat said air upon operating said blower and burning fuel in said combustion chamber and discharge heated air through said air discharge conduit.

References Cited in the file of this patent
UNITED STATES PATENTS

| | | |
|---|---|---|
| 122,684 | Tupper | Jan. 9, 1872 |
| 142,363 | Wilson | Sept. 2, 1873 |
| 186,725 | Guardiola | Jan. 30, 1877 |
| 1,144,469 | Giles | June 29, 1915 |
| 1,448,985 | Yewell | Mar. 20, 1923 |
| 1,814,076 | Carnahan | July 14, 1931 |
| 2,158,338 | Rock | May 16, 1939 |
| 2,299,901 | Johnston | Oct. 27, 1942 |
| 2,412,088 | Holthouse | Dec. 3, 1946 |
| 2,532,994 | Chausse | Dec. 5, 1950 |